(12) United States Patent
Choe et al.

(10) Patent No.: US 9,569,820 B2
(45) Date of Patent: Feb. 14, 2017

(54) METHOD AND APPARATUS FOR IMAGE CORRECTION

(71) Applicant: Samsung Electronics Co., Ltd., Suwon-si (KR)

(72) Inventors: Won-hee Choe, Seoul (KR); Jae-guyn Lim, Seongnam-si (KR); Seong-deok Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 14/146,256

(22) Filed: Jan. 2, 2014

(65) Prior Publication Data
US 2014/0193095 A1 Jul. 10, 2014

(30) Foreign Application Priority Data
Jan. 4, 2013 (KR) ........................ 10-2013-0001212

(51) Int. Cl.
G06K 9/40 (2006.01)
G06T 5/00 (2006.01)
G06T 5/10 (2006.01)

(52) U.S. Cl.
CPC ............... *G06T 5/002* (2013.01); *G06T 5/008* (2013.01); *G06T 5/10* (2013.01); *G06T 2207/10101* (2013.01); *G06T 2207/10132* (2013.01); *G06T 2207/20064* (2013.01)

(58) Field of Classification Search
CPC ........... G06T 5/002; G06T 5/008; G06T 5/10; G06T 2207/10101; G06T 2207/10132; G06T 2207/20064

USPC ....... 382/247, 264, 128, 131, 190, 275, 260, 382/173
See application file for complete search history.

(56) References Cited

U.S. PATENT DOCUMENTS

| 4,783,839 | A | * | 11/1988 | Bamber | G01S 7/412 348/163 |
| 5,479,926 | A | * | 1/1996 | Ustuner | G01S 7/52026 348/224.1 |
| 5,497,777 | A |   | 3/1996 | Abdel-Malek et al. | |
| 5,619,998 | A |   | 4/1997 | Abdel-Malek et al. | |
| 5,841,889 | A | * | 11/1998 | Seyed-Bolorforosh | G01S 7/52046 382/128 |

(Continued)

FOREIGN PATENT DOCUMENTS

| JP | 2000-030044 | 1/2000 |
| KR | 10-2004-0070404 | 8/2004 |

(Continued)

OTHER PUBLICATIONS

Chen et al., "Aggressive region growing for speckle reduction in ultrasound images", Pattern Recognition Letters pp. 677-691, published in 2003.*

(Continued)

*Primary Examiner* — Mekonen Bekele
(74) *Attorney, Agent, or Firm* — NSIP Law

(57) ABSTRACT

Image correcting methods and apparatuses for removing speckles from an image are provided. The image correcting method includes selecting a first region in an image; removing a speckle from a second region except for the first region from the image by using image information at a predetermined frequency band in the image; and increasing a contrast level of the first region.

19 Claims, 6 Drawing Sheets

(56) References Cited

U.S. PATENT DOCUMENTS

| | | | |
|---|---|---|---|
| 6,579,239 B1* | 6/2003 | Avinash | G01S 7/52073 600/443 |
| 7,346,228 B2* | 3/2008 | Sabourin | G01S 15/8979 382/132 |
| 7,567,349 B2 | 7/2009 | Tearney et al. | |
| 7,725,147 B2 | 5/2010 | Li et al. | |
| 7,983,456 B2* | 7/2011 | Rao | G06T 5/002 382/128 |
| 8,157,737 B2* | 4/2012 | Zhang | G01S 15/8995 600/437 |
| 9,081,097 B2* | 7/2015 | Rao | G01S 15/8977 |
| 2002/0097439 A1* | 7/2002 | Braica | G06K 15/1209 358/3.26 |
| 2005/0053305 A1* | 3/2005 | Li | A61B 8/00 382/260 |
| 2006/0084869 A1* | 4/2006 | Kim | G06T 5/002 600/437 |
| 2006/0184023 A1* | 8/2006 | Satoh | A61B 8/14 600/437 |
| 2007/0065009 A1* | 3/2007 | Ni | G01S 7/52034 382/173 |
| 2007/0071292 A1* | 3/2007 | Rao | G06T 5/002 382/128 |
| 2008/0208061 A1* | 8/2008 | Halmann | A61B 8/13 600/459 |
| 2009/0086275 A1* | 4/2009 | Liang | H04N 1/3878 358/3.21 |
| 2009/0171207 A1 | 7/2009 | Imamura et al. | |
| 2009/0303199 A1* | 12/2009 | Cho | G06F 3/04883 345/173 |
| 2009/0306507 A1* | 12/2009 | Hyun | A61B 8/08 600/443 |
| 2010/0040263 A1 | 2/2010 | Li et al. | |
| 2010/0286525 A1 | 11/2010 | Osumi | |
| 2013/0207992 A1* | 8/2013 | Wasberger | G06T 5/00 345/592 |

FOREIGN PATENT DOCUMENTS

| | | |
|---|---|---|
| KR | 10-2005-0026886 | 3/2005 |
| KR | 10-2007-0032140 | 3/2007 |
| KR | 10-2011-0020969 | 3/2011 |

OTHER PUBLICATIONS

Freiburger and Trahey:"Parallel Processing Techniques for the Speckle Brightness Phase Aberration Correction Algorithm" IEEE Transactions on Ultrasonics, Ferroelectrics, and Frequency Control, vol. 44, No. 2, Mar. 1997.*

Schmitt, Joseph M., S.H. Xiang, and Kin M. Yung. "Speckle in Optical Coherence Tomography: An Overview." Journal of Biomedical Optics 4 No. 1 (Jan. 1, 1999), pp. 95-105.

* cited by examiner

METHOD AND APPARATUS FOR IMAGE CORRECTION

CROSS-REFERENCE TO RELATED APPLICATION

This application claims the benefit under 35 U.S.C. §119(a) of Korean Patent Application No. 10-2013-0001212, filed on Jan. 4, 2013, in the Korean Intellectual Property Office, the entire disclosure of which is incorporated herein by reference for all purposes.

BACKGROUND

1. Field

The following description relates to image correcting methods and apparatuses for removing speckles from an image.

2. Description of the Related Art

Methods and apparatuses for observing inner structures of subjects such as human tissues or various materials are being widely used in various fields. Some examples are various kinds of internal transmitting images and tomography photographing equipment, such as an X-ray system, a computerized tomography (CT) scanner, a magnetic resonance imaging (MRI) apparatus, and an ultrasound system. Such equipment are used in the medical field because they identify cause, position, and progression of various kinds of diseases without cutting an inner structure of a human body or a living body. These diagnosis equipment are less harmful to a living body, provide a high-resolution image at a reasonable price, are mobile, and convenient to use. One such equipment, an optical coherence tomography (OCT) apparatus, uses interference between a light, which is irradiated to and reflected from a subject, and a reference light to capture an image of an inner structure of the subject. OCT provide high-resolution images, is harmless to a human body, and is widely used in the medical field due to its advantages.

Some methods of removing speckles from 2D ultrasonic images are described below. Since speckles occur by interference between reflective signals of adjacent reflectors, it is possible to decrease the speckles by decomposing signals generated from the reflectors. In addition, different ultrasonic images that represent the same position are obtained and shape deformation of the speckles on each ultrasonic image is averaged so that it is possible to reinforce image information on the tissues and to decrease the speckles. Moreover, it is possible to decrease speckles in an image by digital filtering, which may be implemented as a multi-scale technique using wavelet transform, which is a technique using a partial differential equation and a non-local means (NLM) technique using a mean of pixels adjacent to a current pixel in an image.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an image correcting method including selecting a first region in an image; removing a speckle from a second region except for the first region from the image by using image information at a predetermined frequency band in the image; and increasing a contrast level of the first region and decreasing a contrast level of a region of the speckle in the second region.

Removing the speckle may comprise selecting the second region from the image including the image information at the predetermined frequency band by using positional information of the selected first region, and removing the speckle from the selected second region.

The image correcting method may further comprise creating a speckle removed image by combining the image information at the predetermined frequency band in the speckle removed image with the image information at a remaining frequency band except for the predetermined frequency band, and wherein the increasing the contrast level may comprise increasing the contrast level of the first region and decreasing the contrast level of the region of the speckle by using the speckle removed image.

Selecting of the first region may comprise the selecting of the first region in the image by a user or by analyzing shape information on a subject displayed in the image.

The image information at the predetermined frequency band may comprise high frequency signals that are included in the image.

Removing of the speckle may comprise the removing of the speckle by using a first model including speckle information on a tissue that is included in a subject in the image.

Increasing of the contrast level may comprise increasing brightness values of pixels corresponding to the first region among pixels in the image and decreasing brightness values of pixels corresponding to the region of the speckle.

Increasing of the contrast level may comprise aligning pixels in the image on the basis of the brightness values of the pixels; increasing the brightness values of the pixels corresponding to the first region by mapping, to a first predetermined brightness value, a brightness value which most pixels represent among the pixels corresponding to the first region; and decreasing the brightness values of the pixels of the region of the speckle by mapping, to a second predetermined brightness value, a brightness value which most pixels represent among the pixels corresponding to the region of the speckle.

Aligning of pixels in the image may comprise the aligning of pixels in the image by using a second model including information on an image recreating apparatus and a tissue that is included in a subject in the image.

A non-transitory computer readable storage medium having thereon a program to execute the image correcting method with a computer.

The first region may comprises a region of interest.

In another aspect, there is provided an image correcting apparatus including a region of interest selector configured to select a first region in an image; a speckle remover configured to remove a speckle from a second region except for the first region from the image by using image information at a predetermined frequency band in the image; and a contrast processor configured to increase a contrast level of the first region and decreases a contrast level of a region of the speckle in the second region.

The speckle remover may be configured to select the remaining region from the image including the image information at the predetermined frequency band by using positional information of the selected first region, and to remove the speckle from the selected second region.

The image correcting apparatus may comprise an image recreator that is configured to create a speckle removed image by combining the image information at the predetermined frequency band in the speckle removed image with the image information at a remaining frequency band except for the predetermined frequency band, wherein the contrast processor is configured to increase the contrast level of the first region and decrease the contrast level of the region of the speckle by using the speckle removed image.

The region of interest may be selected from the image by a user or is selected by analyzing shape information of a subject displayed in the image.

The image information at the predetermined frequency band may comprises high frequency signals that are included in the image.

The speckle remover may be configured to remove the speckle by using a first model including speckle information on a tissue that is included in a subject in the image.

The contrast processor may be configured to increase brightness values of pixels corresponding to the first region among pixels in the image and to decreases brightness values of pixels corresponding to the region of the speckle.

The contrast processor may be further configured to align pixels in the image on the basis of the brightness values of the pixels; increase the brightness values of the pixels corresponding to the first region by mapping, to a first predetermined brightness value, a brightness value which most pixels represent among the pixels corresponding to the first region; and decrease the brightness values of the pixels of the region of the speckle by mapping, to a second predetermined brightness value, a brightness value which most pixels represent among the pixels corresponding to the region of the speckle.

The contrast processor may be configured to use a second model including information on an image recreating apparatus and a tissue in a recreated image to align pixels in the image.

In another aspect, there is provided an image correcting system including an image creating apparatus configured to create an image including a region of interest; an image correcting apparatus configured to select the region of interest in the image, remove a speckle from a remaining region except for the region of interest in the image by using image information at a predetermined frequency band in the image, and increase a contrast level of the region of interest; and an image display apparatus configured to display the image increased contrast level.

Other features and aspects may be apparent from the following detailed description, the drawings, and the claims.

Figure 1:
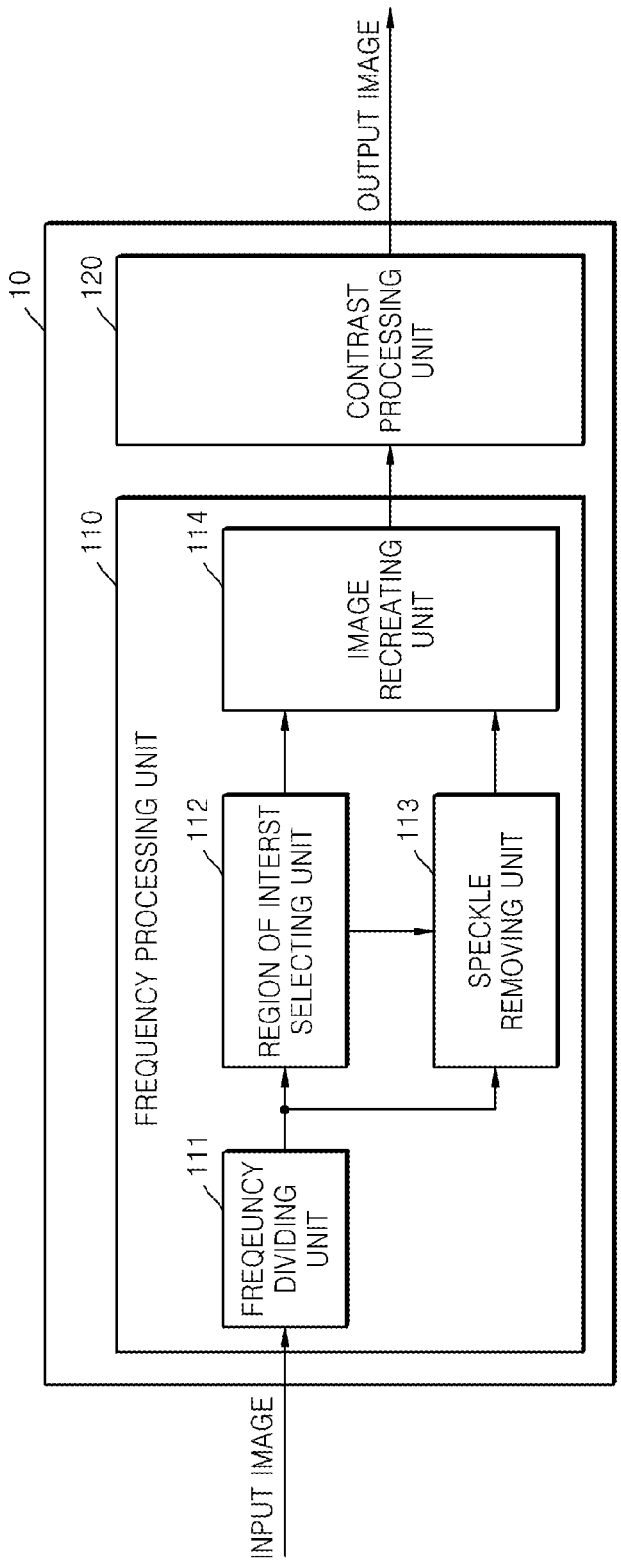
FIG. 1 is a diagram illustrating an example of an image correcting apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. In addition, descriptions of well-known functions and constructions may be omitted for increased clarity and conciseness.

FIG. 1 is a diagram illustrating an example of an image correcting apparatus 10. Referring to FIG. 1, the image correcting unit 10 includes a frequency processing unit 110 and a contrast processing unit 120. The frequency processing unit 110 may include a frequency dividing unit 111, a region of interest selecting unit 112, a speckle removing unit 113, and an image recreating unit 114.

Only components related to the present embodiment are illustrated in the image correcting apparatus 10 of FIG. 1. Thus, those skilled in the art may understand that general components except for components illustrated in FIG. 1 may be further included. For example, the image correcting apparatus 10 may include an interface unit (not illustrated). The interface unit may be responsible for inputting and outputting input information regarding a user and an image. The interface unit may include a network module for connection to a network and a universal serial bus (USB) host module for forming a data transfer channel with a mobile storage medium, depending on a function of the image correcting apparatus 10. In addition, the interface unit includes an input/output device such as a mouse, a keyboard, a touch screen, a monitor, a speaker, and a software module for running the input/output device. In addition, the image correcting apparatus 10 may further include a storage unit (not illustrated) that stores models that are described below. The storage unit may include, for example, a hard disk drive (HDD), a read only memory (ROM), a random access memory (RAM), a flash memory, or a memory card as an ordinary storage medium.

The frequency processing unit 110 and the contrast processing unit 120 that are illustrated in FIG. 1 may correspond to one or a plurality of processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processor may be implemented as an array of numerous logic gates and may also be implemented as a combination of a general-purpose microprocessor with a memory unit which stores a program that may be executed by the microprocessor. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The frequency dividing unit 111 divides frequency signals of an input image into high-frequency signals and low-frequency signals, transmits the low-frequency signals to the region of interest selecting unit 112, and transmits the high-frequency signals to the speckle removing unit 113. The input image may be an image, such as, for example, an OCT image, and the frequency dividing unit 111 may perform bilateral decomposition or wavelet transform to divide the frequency signals of the input image into the high-frequency signals and the low-frequency signals. The frequency dividing unit 111 may perform the bilateral decomposition or the wavelet transform using algorithm that are generally known to those skilled in the art.

Figure 2:
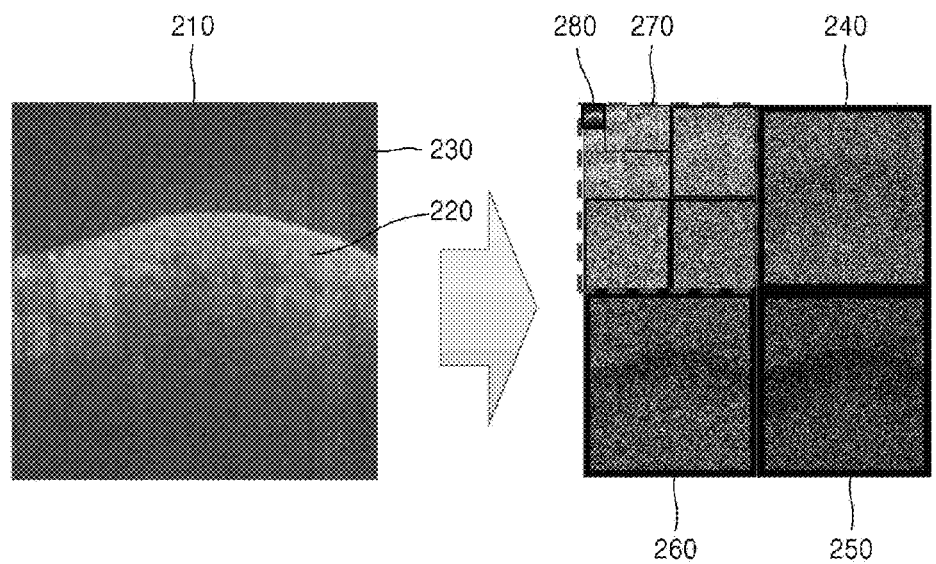
FIG. 2 is a diagram illustrating an example in which a frequency dividing unit performs wavelet transform on an input image.

FIG. 2 is a diagram illustrating an example in which a frequency dividing unit 111 performs wavelet transform on an input image. Referring to FIG. 2, a left image 210 of FIG. 2 illustrates an image before the frequency dividing unit (indicated as 111 in FIG. 1) performs the wavelet transform, and a right image of FIG. 2 illustrates an image after the frequency dividing unit performs the wavelet transform. The left image 210 may include, but is not limited to, an internal tissue 220 and another part 230.

The frequency dividing unit may decompose the input image 210 into image information with multi levels of a plurality of directions to obtain image information that is filtered as low-frequency band signals 270 and high-frequency band signals 240 to 260. The low-frequency band signals 270 may be image information that is obtained by decreasing a resolution of an image, and the high-frequency band signals 240 to 260 may be image information with specific directions that are made by extracting direction information from an image. The frequency dividing unit 111 may perform wavelet transform on the input image 210 to obtain image information on high-frequency band signals with horizontal direction 260, vertical direction 240 and diagonal direction and image information on the low-frequency band signals 270.

In addition, the frequency dividing unit 111 may again decompose image information of the low-frequency band signals 270 into low-frequency band signals and high-frequency band signals, and may obtain pieces of multilevel image information with a plurality of directions by repeating this process.

The frequency dividing unit 111 selects the highest-level information 280 among the decomposed multilevel image information (i.e., wavelet transformed coefficients). Then, the frequency dividing unit 111 transmits the selected highest-level information 280 to the region of interest selecting unit (indicated as 112 in FIG. 1). The highest-level information 280 may represent low-frequency signals of an input image. Information except for the highest-level information 280 means high-frequency signals of the input image. Further, the frequency dividing unit 111 transmits information except for the highest-level information 280 to the speckle removing unit (indicated as 113 in FIG. 1).

Referring to FIG. 1, the region of interest selecting unit 112 selects a region of interest from an input image. For example, the region of interest selecting unit 112 may select a region of interest by using the highest-level information, indicated as 280 in FIG. 2, (i.e., an image including low-frequency signals) that is transmitted from the frequency dividing unit 111. The region of interest may corresponds to a part of the input image that requires a higher resolution. For example, if it is assumed that the input image is a medical image, the region of interest may mean a region of a tissue that requires diagnosis, or a part of the tissue.

A user may select the region of interest directly from the input image or the selection may be performed after analyzing the shape information of a subject that is represented in the input image. The region of interest selecting unit 112 may select the region of interest from the highest-level information, indicated as 280 in FIG. 2 (i.e, an image including low-frequency signals) or after analyzing shape information of a subject included in an image including low-frequency signals, according to an instruction of a user that is input through the interface unit (not shown).

An example in which the region of interest selecting unit 112 analyzes shape information of a subject and then selects the region of interest is described as follows. The region of interest selecting unit 112 may select, as a region of interest, a part exceeding a predetermined brightness value from the highest-level information 280 of FIG. 2 transmitted from the frequency dividing unit 111. The predetermined brightness value may indicate a mean of values of an approximation band of the highest-level.

The region of interest selecting unit 112 transmits positional information of the selected region of interest to the speckle removing unit 113. In addition, the region of interest selecting unit 112 transmits the highest-level information to the image recreating unit 114.

The speckle removing unit 113 removes speckles existing in the remaining regions except for the region of interest in an image from pieces of image information at a predetermined frequency band in the image. The speckle removing unit 113 selects the remaining regions except for the region of interest from an image including pieces of image information at a predetermined frequency band, by using positional information of the region of interest selected by the region of interest selecting unit 112. Then, the speckle removing unit 113 removes speckles from the selected regions. The pieces of image information at the predetermined frequency band may represent high-frequency signals (i.e., the remaining information except for the highest-level information 280) among frequency signals that are included in an input image.

Figure 3:
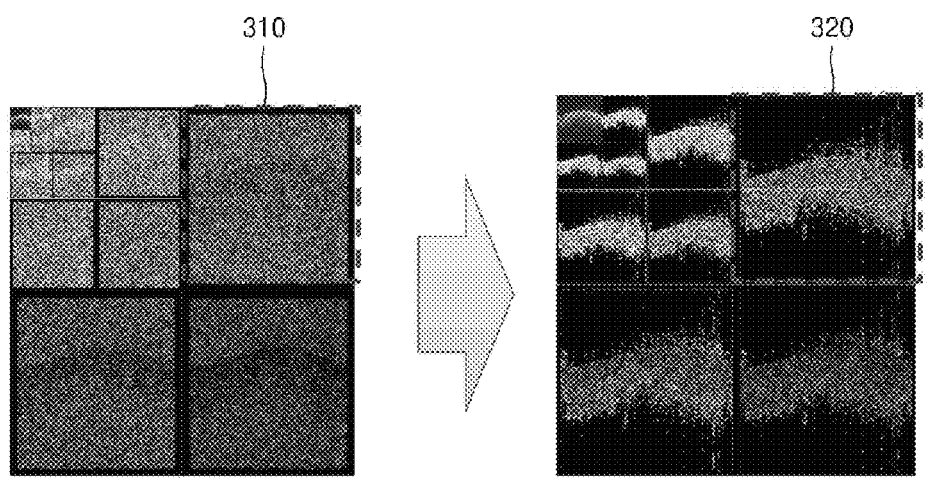
FIG. 3 is a diagram illustrating an example of a wavelet coefficients after a speckle removing unit has removed speckles from the remaining regions except for regions of interest in an image including image information at a predetermined frequency band.

FIG. 3 is a diagram illustrating an example of wavelet coefficients after a speckle removing unit (indicated as 113 in FIG. 1) has removed speckles from the remaining regions except for regions of interest in an image including pieces of image information at a predetermined frequency band. Referring to FIG. 3, the left images represent ones before the speckle removing unit 113 removes speckles from an image and right images represent ones after the speckle removing unit 113 has removed speckles from the image. The left images are ones that include high-frequency signals transmitted to the speckle removing unit 113 after the frequency dividing unit 111 has performed wavelet transform. Thus, left images of FIG. 3 correspond to right images of FIG. 2.

Speckles (or speckle signals) mean signals generated by optical scattering that occurs in an object. The speckles are patterns that are generated due to constructive and disruptive properties of light that are caused by scattering and reflective properties of light that vary depending on a size and density of the scatter. These patterns are mixed with signals reflected from internal tissues included in an image, which decrease contrast of the image and distorts shape information of the tissues.

An optical coherence tomography imaging technology is used to irradiate light onto a surface of an object to be measured and create an image in the depth direction of the image by using a difference (that is a coherence signal) between a signal reflected from the inside of the object and a reference signal. Speckles may be found in the OCT images or other images, like ultrasound images. Information on a subject of an image is mainly included in low-frequency signals that are included in the OCT image, and information on speckles is mainly included in high-frequency signals thereof. Thus, the speckle removing unit (indicated as 113 in FIG. 1) may remove speckles from an image by using high-frequency signals of an input image to create a clearer image.

The speckle removing unit 113 may remove speckles by performing wavelet coefficient shrinkage filtering on high-frequency signals of an image with respect to the remaining regions except for regions of interest. For example, the speckle removing unit 113 performs wavelet coefficient shrinkage filtering on image information 310 of high-frequency band signals with a vertical direction obtained from the frequency dividing unit 111, to obtain a wavelet coefficient 320 for the image information 310. In this way, the speckle removing unit 113 may obtain a wavelet coefficient for each of pieces of image information received from the frequency dividing unit (indicated as 111 in FIG. 1).

The speckle removing unit 113 may remove speckles by using a first model that includes speckle information on ingredients of tissues in a subject that is represented in an image. The speckle removing unit 113 may use the first model when obtaining a wavelet coefficient for each of pieces of image information received from the frequency dividing unit 111. The first model may represent an ingredient distribution model by a speckle depending on each frequency band. Since a light reflecting property is also determined by the ingredients that constitute tissues, similar speckles are found in OCT images of the same tissue. Thus, when creating images of internal tissues with the OCT apparatus, speckles in images are similar for images of similar tissue.

Before an image is input to the image correcting apparatus (indicated as 10 in FIG. 1), the first model may be created by combining ingredient distribution information from previous images including such tissue, and the speckle removing unit 113 may remove speckles by using the first model. The first model may be stored and utilized in a storage unit (not illustrated) that is included in the image correcting apparatus 10.

Referring to FIG. 1, the speckle removing unit 113 transmits to the image recreating unit 114, high-frequency signals in which speckles have been removed from the remaining regions except for regions of interest. The image recreating unit 114 combines pieces of image information at a predetermined frequency band, from which speckles have been removed, with pieces of image information at the remaining frequency bands except for the predetermined frequency band to create a speckle-removed image. The image recreating unit 114 combines the pieces of image information and performs inverse transform with the combined pieces of image information to create a speckle-removed image. The pieces of image information at the predetermined frequency band mean high-frequency signals transmitted from the speckle removing unit 113 and the pieces of image information at the remaining frequency bands except for the predetermined frequency band mean low-frequency signals (that is, the highest-level information) (indicated as 280 in FIG. 2) that are transmitted from the region of interest selecting unit 112. In addition, the inverse transform means a transformation performed by the frequency dividing unit 111 using transform, such as, for example, inverse wavelet transform.

The image recreating unit 114 combines signals transmitted from the speckle removing unit 113 with signals transmitted from the region of interest selecting unit 112 and inversely transforms the combined result to create an image. The image created by the image recreating unit 114 may be an image in which speckles have been removed from the remaining regions except for regions of interest. The image recreating unit 114 transmits data on the created image to the contrast processing unit 120.

The contrast processing unit 120 increases a contrast level of a region of interest and a contrast level of a region of a speckle by using the speckle-removed image. The region of interest may be a region, such as, for example a region corresponding to a tissue in an image. The contrast processing unit 120 increases the contrast level of the region of interest and the contrast level of the region corresponding to the speckle through statistical analysis by using data on an image transmitted from the image recreating unit 114. Statistical analysis could include, but is not limited to, using a histogram that represents a brightness property of a speckle and that of a tissue in an image.

An image transmitted to the contrast processing unit 120 includes information in which speckles have been removed from the remaining regions except for the region of interest among frequency regions. The contrast processing unit 120 may decrease brightness of artifacts that may occur by speckles remaining on an image and may increase brightness of a tissue in the image through statistical analysis.

Figure 7:
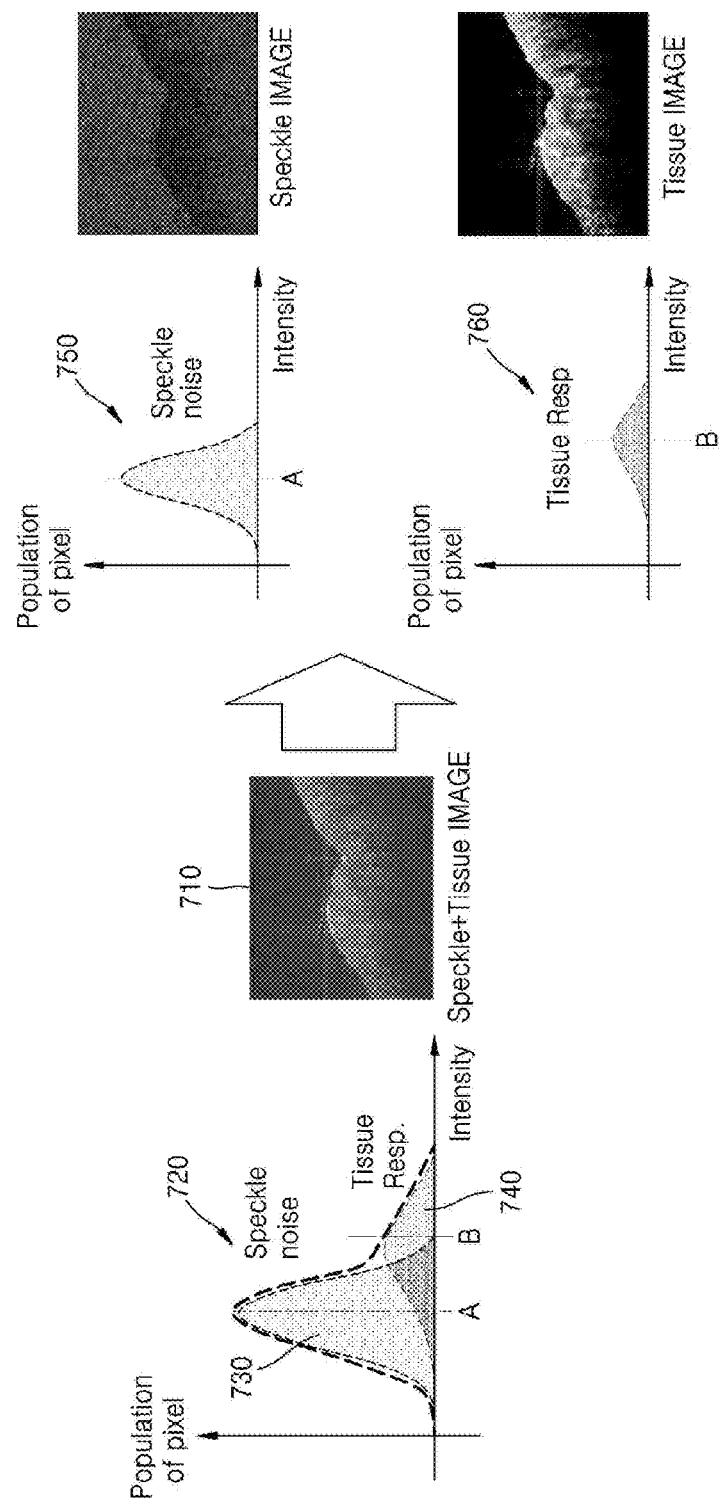
FIG. 7 is a diagram illustrating examples of histograms and images that are used for statistical analysis.

FIG. 7 is a diagram illustrating examples of histograms and images that are used for statistical analysis. Reference number 710 indicates an example of an image transmitted to the contrast processing unit (indicated as 120 in FIG. 1), and reference number 720 indicates a histogram corresponding to the image. As described previously, the image to the contrast processing unit may include speckles, but as shown in FIG. 7, a histogram 730 representing a brightness property of speckles and a histogram 740 representing a brightness property of a tissue have different shapes from each other. For example, the histogram 750 of the speckles and the histogram 760 of the tissue may represent a shape of a Gaussian distribution with different central values A and B. The shape of the histogram 750 of the speckles shows a Rayleigh distribution property that may be expressed as Equation 1 below. The Rayleigh distribution shows a similar shape to the Gaussian distribution.

$$P(I) = \frac{I}{\sigma^2}\exp(-I^2/2\sigma^2) \qquad \text{Equation 1}$$

In Equation 1 above, σ means standard deviation, and P (I) means a probability density function that has a condition of $I\epsilon[0, \infty)$.

Referring to FIG. 1, through statistical analysis, the contrast processing unit 120 may increase brightness values of pixels corresponding to a region of interest and decrease brightness values of pixels of a region corresponding to a speckle, among pixels in an image. The region of interest may be, for example, a region corresponding to a tissue in an image. Thus, the contrast processing unit 120 increases a contrast level of an image to create an image in which a region of interest is processed more clearly.

Figure 4:
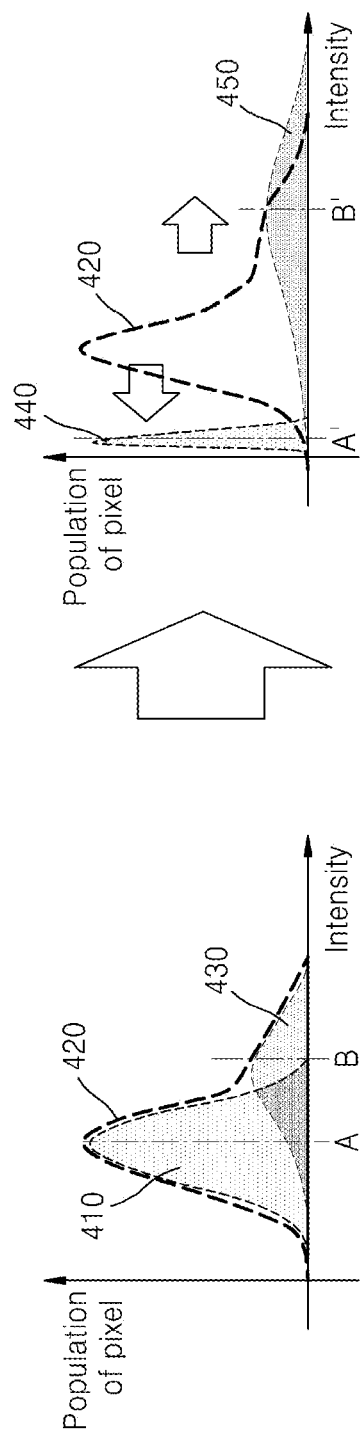
FIG. 4 is diagram illustrating an example in which a contrast processing unit increases a contrast level of an image.

FIG. 4 is a diagram illustrating an example in which a contrast processing unit (indicated as 120 in FIG. 1)

increases a contrast level of an image. The contrast processing unit 120 aligns pixels in an image based on a brightness value of a pixel to obtain a histogram 420 of an overall image. This histogram 420 includes a histogram 410 of speckles and a histogram 430 of a tissue.

The histogram 420 of the overall image may also be obtained by using a second model that is stored in a storage unit (not illustrated) of the image correcting apparatus 10. The second model may include information on an image creating apparatus and a tissue in the created image. For example, if an OCT apparatus creates images of internal tissues, speckles in image for the same tissue are similar. Thus, the histogram 410 of speckles and the histogram 420 of a tissue in the image may have similar shapes. Before an image is input to the image correcting apparatus, the second model may be created by combining histograms of speckles with those of tissues from previous images including such tissue, and the contrast processing unit 120 may obtain the histogram 420 of the overall image from the second model. The second model may be stored and utilized in a storage unit in the image correcting apparatus.

The contrast processing unit increases a brightness value of pixels corresponding to a region of interest by mapping a brightness value among pixels corresponding to the region of interest, to a first brightness value. For example, the contrast processing unit may map a value B corresponding to the center of the histogram 430 of a region of interest (that is, a region corresponding to a tissue in an image) to a first predetermined brightness value B' to overall move to 450 the histogram 430 of the region of interest. Thus, a brightness value of pixels corresponding to a region of interest in an image may be overall increased.

The contrast processing unit decreases a brightness value of pixels of a region corresponding to a speckle by mapping a brightness value among pixels corresponding to the remaining regions except for the region of interest, to a second predetermined brightness value. For example, the contrast processing unit may map a value A corresponding to the center of the histogram 410 of a speckle to a second predetermined brightness value A' to overall move to 440 the histogram 410 of the speckle. Thus, a brightness value of pixels a region corresponding to a speckle in an image may be overall decreased.

Figure 5:
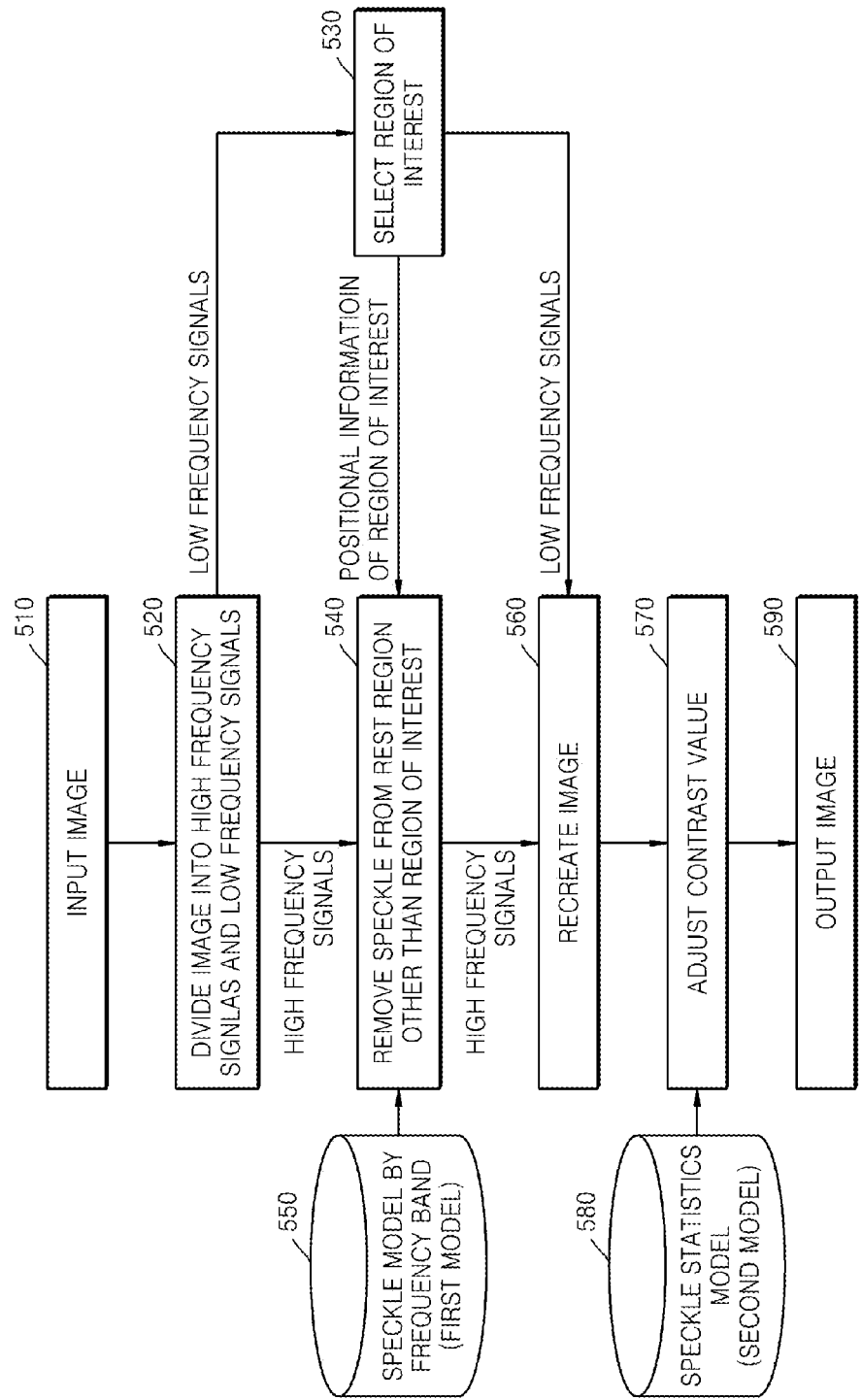
FIG. 5 is diagram illustrating an example of a method of removing speckles from an image.

FIG. 5 is a diagram illustrating an example of a method of removing speckles from an image. Referring to FIG. 5, the method of removing the speckles from the image are time-series processed by the image correcting apparatus illustrated in FIG. 1. The operations in FIG. 5 may be performed in the sequence and manner as shown, although the order of some operations may be changed without departing from the spirit and scope of the illustrative examples described. Many of the operations shown in FIG. 5 may be performed in parallel or concurrently.

In 510, the image correcting apparatus receives an image. The image may include, but is not limited to, an image that is captured from an internal tissue of a subject. In addition, the image may include, but is not limited to, an OCT image or an ultrasonic image. In 520, the frequency dividing unit divides frequency signals in an image into high-frequency signals and low-frequency signals. The frequency dividing unit (indicated as 111 in FIG. 1) transmits the low-frequency signals to the region of interest selecting unit, and transmits the high-frequency signals to the speckle removing unit.

In 530, the region of interest selecting unit selects a region of interest by using the low-frequency signals. The region of interest may be selected by user input or through analysis of shape information of an image by the region of interest selecting unit. The region of interest may represent an internal tissue in an image.

In 540, the speckle removing unit removes speckles from the remaining regions except for the region of interest in the image. The speckle removing unit may receive and utilize positional information on the region of interest from the region of interest selecting unit. In addition, the speckle removing unit may remove speckles by using information of a speckle model by frequency band (a first model) 550 that is stored in a storage unit.

In 560, the image recreating unit (indicated as 114 in FIG. 1) combines low-frequency signals transmitted from the region of interest selecting unit with high-frequency signals transmitted from the speckle removing unit to recreate an image. The recreated image represents an image that is created by performing inverse wavelet transform on the combined frequency signals.

In 570, the contrast processing unit increases a contrast level of a region of interest with a region corresponding to a speckle by using the recreated image. The contrast processing unit may increase the contrast level of the image by using information of a speckle statistics model (a second model) 580. In 590, the image correcting apparatus outputs the image.

Figure 6:
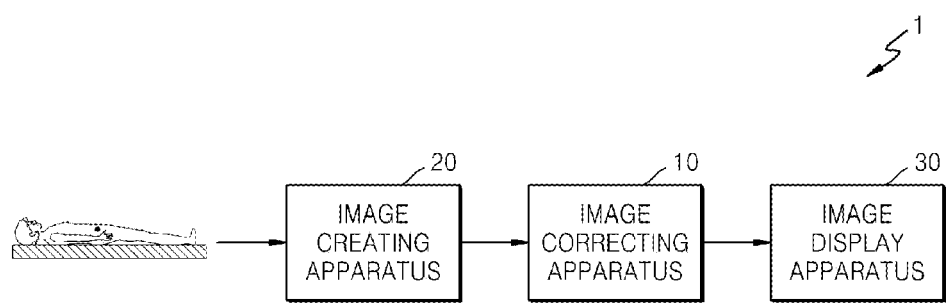
FIG. 6 is a diagram illustrating an example of a service environment of an image correcting system.

FIG. 6 is a diagram illustrating an example of a service environment of an image correcting system 1. The image correcting system 1 according to the present embodiment includes an image creating apparatus 20, an image correcting apparatus 10, and an image display apparatus 30. Those skilled in the art may understand that other components may be included without departing from the spirit of the image correcting system 1.

Referring to FIG. 6, the image creating apparatus 20 creates an image that includes a region of interest. Then, the image creating apparatus 20 transmits the created image to the image correcting apparatus 10.

The image correcting apparatus 10 selects a region of interest from the image transmitted from the image correcting apparatus 10. The image correcting apparatus 10 removes speckles from the remaining regions except for the region of interest in an image by using image information at a predetermined frequency band in the image. The image correcting apparatus 10 increases a contrast level of the region of interest with a region corresponding to a speckle by using a speckle removed image. Then, the image correcting apparatus 10 transmits the image with the increased contrast level to the image display apparatus 30.

The image display apparatus displays the speckle removed image that is created by the image correcting apparatus 10. The image display apparatus 30 may be implemented as a liquid crystal display (LCD), a light-emitting diode (LED) display, a plasma display panel (PDP), a screen, a terminal, and the like. A screen may be a physical structure that includes one or more hardware components that provide the ability to render a user interface and/or receive user input. The screen can encompass any combination of display region, gesture capture region, a touch sensitive display, and/or a configurable area. The screen can be embedded in the hardware or may be an external peripheral device that may be attached and detached from the apparatus. The display may be a single-screen or a multi-screen display. A single physical screen can include multiple displays that are managed as separate logical displays permitting different content to be displayed on separate displays although part of the same physical screen.

As described above, the image correcting apparatus 10 may remove, from a speckle containing image, speckles without any damage to information that represents a tissue in the image, and may enhance a contrast level of the image. In addition, it is possible to increase efficiency when compared to time taken to remove speckles from an image. Accordingly, it is possible to perform automatic disease diagnosis by using an image without user intervention and to enhance accuracy on disease diagnosis.

The units and apparatuses described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), CD-ROMs, magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image correcting method comprising:
   selecting a first region in an image comprising non-overlapping first and second regions;
   removing a speckle from the second region, by using image information associated with a predetermined frequency band; and
   increasing brightness values of pixels of the first region by mapping, to a first predetermined brightness value, a brightness value associated with a largest quantity of pixels among the pixels of the first region, and
   decreasing brightness values of pixels of a region of a speckle by mapping, to a second predetermined brightness value, a brightness value associated with a largest quantity of pixels among the pixels of the region of the speckle.

2. The image correcting method of claim 1, wherein removing the speckle comprises:
   selecting the second region from the image, including the image information associated with the predetermined frequency band, by using positional information of the selected first region, and
   removing the speckle from the selected second region.

3. The image correcting method of claim 2, further comprising:
   creating a speckle-removed image, by combining the image information associated with the predetermined frequency band of the speckle-removed second region with the image information associated with a remaining frequency band that does not include the predetermined frequency band, and
   wherein the speckle-removed image is used to increase the contrast level of the first region, and decrease the contrast level of the region of the speckle in the second region.

4. The image correcting method of claim 1, wherein the selecting of the first region comprises:
   selecting of the first region in the image by a user, or by analyzing shape information of a subject displayed in the image.

5. The image correcting method of claim 1, wherein the image information associated with the predetermined frequency band comprises high frequency signals included in the image.

6. The image correcting method of claim 1, wherein the removing of the speckle comprises the removing of the speckle, by using a first model including speckle information of a subject in the image.

7. The image correcting method of claim 1, further comprising:
   aligning pixels in the image, on the basis of the brightness values of the pixels.

8. The image correcting method of claim 7, wherein the aligning of pixels in the image comprises using a second model including information of an image recreating apparatus and a subject in the image.

9. A non-transitory computer readable storage medium having thereon a program to execute the image correcting method of claim 1 with a computer.

10. The image correcting method of claim 1, wherein the first region comprises a region of interest.

11. An image correcting apparatus comprising:
    a processor configured to
       select a first region in an image comprising non-overlapping first and second regions;

remove a speckle from the second region, by using image information associated with a predetermined frequency band of the image; and increase brightness values of pixels of the first region by mapping, to a first predetermined brightness value, a brightness value associated with a largest quantity of pixels among the pixels of the first region, and decrease brightness values of pixels of a region of the speckle by mapping, to a second predetermined brightness value, a brightness value associated with a largest quantity of pixels among the pixels of the region of the speckle.

12. The image correcting apparatus of claim 11, wherein the processor is further configured to select another region from the image, including the image information associated with the predetermined frequency band, by using positional information of the selected first region, and to remove the speckle from the selected second region.

13. The image correcting apparatus of claim 12, the processor further configured to:

create a speckle-removed image, by combining the image information associated with the predetermined frequency band of the speckle-removed second region with the image information associated with another frequency band that does not include the predetermined frequency band, wherein the processor is further configured to use the speckle-removed image to increase the contrast level of the first region and decrease the contrast level of the region of the speckle.

14. The image correcting apparatus of claim 11, wherein the first region is selected from the image by a user, or is selected by analyzing shape information of a subject displayed in the image.

15. The image correcting apparatus of claim 11, wherein the image information associated with the predetermined frequency band comprises high frequency signals included in the image.

16. The image correcting apparatus of claim 11, wherein the processor is further configured to remove the speckle, by using a first model including speckle information of a subject in the image.

17. The image correcting apparatus of claim 11, wherein the processor is further configured to:

align pixels in the image, on the basis of the brightness values of the pixels.

18. The image correcting apparatus of claim 17, wherein the processor is further configured to use a second model, including information of an image recreating apparatus and a subject in a recreated image, to align pixels in the image.

19. An image correcting system comprising:

an image creating apparatus configured to create an image including a region of interest that does not overlap with a region of a speckle;

an image correcting apparatus configured to select the region of interest, remove a speckle from the another region, by using image information associated with a predetermined frequency band, increase brightness values of pixels of the region of interest by mapping, to a first predetermined brightness value, a brightness value associated with a largest quantity of pixels among the pixels of the region of interest, and decrease brightness values of pixels of a region of the speckle by mapping, to a second predetermined brightness value, a brightness value associated with a largest quantity of pixels among the pixels of the region of the speckle; and an image display apparatus configured to display the region of interest and the region of the speckle.

* * * * *